United States Patent
Habering

(10) Patent No.: US 11,472,303 B2
(45) Date of Patent: Oct. 18, 2022

(54) MULTI-CONDUCTOR CABLE OF REDUCED DIAMETER AND CONTACT APPARATUS FOR SAME

(71) Applicant: igus GmbH, Cologne (DE)

(72) Inventor: Richard Habering, Cologne (DE)

(73) Assignee: IGUS GMBH, Cologne (DE)

(*) Notice: Subject to any disclaimer, the term of this patent is extended or adjusted under 35 U.S.C. 154(b) by 365 days.

(21) Appl. No.: 16/618,628

(22) PCT Filed: May 30, 2018

(86) PCT No.: PCT/EP2018/064312
§ 371 (c)(1),
(2) Date: Dec. 2, 2019

(87) PCT Pub. No.: WO2018/220092
PCT Pub. Date: Dec. 6, 2018

(65) Prior Publication Data
US 2020/0180450 A1 Jun. 11, 2020

(30) Foreign Application Priority Data
Jun. 2, 2017 (DE) ...................... 20 2017 103 370.8

(51) Int. Cl.
*B60L 53/18* (2019.01)
*B60L 53/16* (2019.01)
(Continued)

(52) U.S. Cl.
CPC ............... *B60L 53/18* (2019.02); *B60L 53/16* (2019.02); *H01B 9/04* (2013.01); *H01R 9/0524* (2013.01); *H01R 24/28* (2013.01); *H01R 24/38* (2013.01)

(58) Field of Classification Search
CPC .......... B60L 53/18; B60L 53/16; H01B 9/04; H01R 9/0524; H01R 24/28; H01R 24/38
(Continued)

(56) References Cited

U.S. PATENT DOCUMENTS 2,268,223 A * 12/1941 Peterson ................ H01B 7/046
174/115
3,261,907 A 7/1966 Morrison
(Continued)

FOREIGN PATENT DOCUMENTS

CN 105655743 A * 6/2016 ............. H01R 13/46
CN 109087749 A * 12/2018
(Continued)

OTHER PUBLICATIONS

Search Report from corresponding German Appln. No. 20 2017 103 370.8, dated Feb. 5, 2018.
(Continued)

*Primary Examiner* — Suresh Memula
(74) *Attorney, Agent, or Firm* — Grossman, Tucker, Perreault & Pfleger, PLLC

(57) ABSTRACT

An electrical multi-conductor cable comprising a plug-in connector, in particular a line with a charging plug for electric vehicles. The cable has a central cable core, a number of conductors which are arranged concentrically in relation to one another in a ring around the cable core and are composed of individual wires, and in each case one insulation between the conductors. According to the invention, the contact apparatus has two clamping shell parts which, on the inner side thereof, have a plurality of receptacles which are radially stepped from one another. In each case one contact body is received in the receptacles of a clamping shell part and makes contact with one of the concentric conductors. Each contact body has a channel (Continued)

shape with a longitudinal extent and a curved cross-sectional profile around an associated conductor. A closure connects the clamping shell parts and fastens said clamping shell parts in the closed position, wherein the clamping shell parts coaxially hold the contact bodies and press each contact body against the respectively associated concentric conductor for contact-making purposes.

20 Claims, 1 Drawing Sheet

(51) Int. Cl.
    *H01B 9/04*     (2006.01)
    *H01R 9/05*     (2006.01)
    *H01R 24/28*     (2011.01)
    *H01R 24/38*     (2011.01)

(58) Field of Classification Search
    USPC ........................................................ 320/109
    See application file for complete search history.

(56) References Cited

U.S. PATENT DOCUMENTS

| | | | | | |
|---|---|---|---|---|---|
| 5,830,009 | A | * | 11/1998 | Tettinger | H01R 24/566 |
| | | | | | 439/805 |
| 5,842,873 | A | * | 12/1998 | Gonzales | H01R 24/50 |
| | | | | | 439/329 |
| 6,338,653 | B1 | * | 1/2002 | Jones | H01R 12/598 |
| | | | | | 439/579 |
| 10,340,644 | B1 | * | 7/2019 | Lee | H01R 24/86 |
| 10,431,944 | B1 | * | 10/2019 | Su | H01R 24/86 |
| 2012/0094553 | A1 | | 4/2012 | Fujiwara et al. | |
| 2016/0064118 | A1 | | 3/2016 | Wakabayashi et al. | |

FOREIGN PATENT DOCUMENTS

| | | | | | |
|---|---|---|---|---|---|
| CN | 113889781 | A | * | 7/2020 | |
| CN | 212571572 | U | * | 2/2021 | |
| CN | 212824484 | U | * | 3/2021 | |
| CN | 213366248 | U | * | 6/2021 | |
| DE | 4004802 | | * | 8/1991 | |
| DE | 102012001150 | B4 | * | 10/2018 | ............... B60L 3/04 |
| EP | 2026439 | | | 2/2009 | |
| EP | 2471144 | | * | 8/2010 | |
| EP | 2793319 | | | 10/2014 | |
| EP | 2894732 | | | 7/2015 | |
| FR | 2693024 | | | 12/1993 | |
| JP | S56103922 | | | 8/1981 | |
| JP | H06333633 | | | 12/1994 | |
| JP | 200082343 | | | 3/2000 | |
| JP | 2007325441 | | | 12/2007 | |
| JP | 2013191278 | | | 9/2013 | |
| WO | WO-9731405 | A1 | * | 8/1997 | ............. F23N 5/107 |
| WO | 2011/023347 | | | 3/2011 | |
| WO | WO-2012046153 | A1 | * | 4/2012 | ........... H05K 7/1432 |
| WO | 2013013713 | | | 1/2013 | |
| WO | WO-2013013713 | | * | 1/2013 | |

OTHER PUBLICATIONS

International Search Report from corresponding PCT Appln. No. PCT/EP2018/064312, dated Jul. 20, 2018.
International Preliminary Report on Patentability from corresponding PCT Appln. No PCT/EP2018/064312, dated Dec. 3, 2019.
English translation of Office Action from related Japanese Appln. No. 2019-565525, dated Apr. 26, 2022.

* cited by examiner

MULTI-CONDUCTOR CABLE OF REDUCED DIAMETER AND CONTACT APPARATUS FOR SAME

FIELD

The invention generally concerns flexible electrical multi-conductor cable comprising a central core and a number of conductors which are arranged in mutually concentric relationship and annularly around the core and comprise individual wires. The invention specifically concerns such a multi-conductor cable having a contact apparatus, in particular for a plug-in connector.

BACKGROUND

A conductor arrangement of the general kind set forth having conductors arranged concentrically around a core is known for example from laid-open application DE 40 04 802 A1, with the purpose of withstanding high dynamic loadings.

U.S. Pat. No. 3,261,907 also proposes, in a multi-conductor power supply cable for high frequencies, arranging the conductors of individual wires in mutually concentric relationship annularly around a core. Besides the main advantage of reducing the impedance it is also stated there that there is the advantage that such a conductor arrangement permits a more compact structure.

In addition, FR 2 693 014 A1 sets out a reduction in diameter of about 30% for a data and power supply cable having a concentric or coaxial arrangement of the conductors.

In actual fact the concentric structure allows a perceptible reduction in the overall diameter of the cable in comparison with the usual structure comprising a bundle of mutually juxtaposed conventional wires of corresponding conductor cross-section.

A reduction in the overall diameter facilitates in particular handling. That is a relevant advantage not only but in particular in manual user applications like for example in relation to charging lines of charging stations for electric vehicles.

A compact cable cross-section becomes particularly significant having regard to the desire for short charging times, that is to say increasing charging currents up to some hundred amps, which inter alia for thermal reasons require large conductor cross-sections of the individual conductors, in particular when using direct current. Currently usual charging cables, for example in accordance with IEC 62196 Type 2, are generally suitable for charging currents up to 32A.

The above-mentioned patent specifications moreover do not offer any solution in regard to the production of multi-conductor cables, in particular for contacting with electrical connecting means like for example plug-in connectors.

FR 2 693 024 A1 expressly confirms that multi-conductor cables of the general kind set forth can typically not be used as power supply cables, precisely because of difficulties in regard to the electrical connections and insulation (see loc. cit. page 5, lines 23 to 28).

US 2012/094553 A1 from another field proposed, for rigid installation systems with coaxial rigid conductors, a special contact apparatus which however is also relatively complicated and cumbersome in terms of fitment.

Also, generally the state of the art hitherto lacks an effective inexpensive solution in regard to contacting the concentric conductors of multi-conductor cables.

SUMMARY

A first object of the invention is to propose an improved simplified contacting apparatus for reduced-diameter multi-conductor cables having concentric conductors. The aim in that respect is to perceptibly reduce in particular the complication and effort in connecting and assembling the cable with connectors.

In relation to an electrical, preferably flexible multi-conductor cable having a central cable core, a number of conductors which are arranged in concentric or coaxial relationship with each other and which extend around the cable core and which are insulated relative to each other and comprising individual wires, it is proposed according to the invention that the contact apparatus includes at least or precisely two clamping shell portions which on the inside thereof have a plurality of receiving means which are stepped radially relative to each other and which follow each other step-like in the direction of the cable axis and for example can be of a trough-like or hollow-shaped configuration. It is further provided that arranged in at least some receiving means, preferably in each receiving means, of at least one clamping shell portion, is a respective separate channel-shaped contact body associated with one of the concentric conductors for contacting purposes. Each contact body has a longitudinal extent and a curved cross-sectional configuration which is intended to surround a peripheral proportion of the associated conductor to bear against same. The contact bodies can be held with their longitudinal extent in mutually coaxial relationship, also in a step-like configuration, in the receiving means of the clamping shell portion or portions.

As a further aspect the invention provides a closure for connecting the clamping shell portions together, that is to say which in a closed position mechanically fixedly connects the clamping shell portions. In that way the clamping shell portions in the closed position can press each of the contact bodies provided for contacting purposes against the respectively associated concentric conductor.

With the proposed contact apparatus, it is possible to assemble concentrically constructed multi-conductor cables with a particularly low level of assembly complication and effort. For that purpose, the cable only has to be placed in a manner corresponding to the step configuration in the arrangement of the contact bodies, that is to say they are stripped of insulation in stepped relationship so that in successive longitudinal portions a different conductor is exposed. Suitable tools and machines are available for that purpose. In the simplest case electrical contacting can then be effected solely by suitably inserting or introducing the step-wise placed cable end into the open position of the clamping shell portions and then closing the clamping shell portions. By virtue of suitable dimensioning and the closure this achieves an adequate pressing force between the contact bodies and the associated peripheral surface of the round conductors. In that respect in particular there is also no need for conventional screw or solder contacting.

Expressed in brief terms, a core aspect of the invention provides that two clamping shells with a stepped arrangement of contact means upon closure simultaneously also achieve contacting of the cable end which is placed step-wise. Corresponding further working steps are not required. Inter alia this ensures rapid contacting which is fault-free by virtue of the predetermined association. The specific configuration of the conductor arrangement with concentric "round conductors" permits a reduction in the outside diameter of about 20% of more with respect to a conventional conductor arrangement for the same current implementation or with the associated conductor cross-sections. The known difficulties in assembly of such special cables are overcome by the invention.

In the present case the term channel shape is also used to denote a short longitudinal portion of a notional channel, that is to say the dimension in the longitudinal direction can be less than in the peripheral direction, similarly for example to a clamping sleeve or clamping shell. In the present case the term "individual wire" is intended quite generally and irrespective of the cross-section of each conductive wire (in particular in accordance with IEV ref. 151-12-28), to also denote inter alia an individual wire in a strand or a conductor cable.

The required force for force-locking contacting can also be predetermined or possibly also adjusted by way of the dimensioning of the clamping shell portions, the contact bodies and/or the closure. By suitable association of the individual steps with each other it is also possible inherently to ensure fault-free contacting insofar as the position of the contact bodies was predetermined. That can possibly be ensured by suitable protection against transposition.

In a development in that respect the closure can be in the form of a quick-action closure which can be closed without the use of a tool, like for example a quick release arrangement, a lever clamping arrangement, for example a toggle lever clamping arrangement, a latching/clip connector or the like.

In a preferred embodiment for reasons of electrical safety the closure is in the form of a non-releasable quick-action closure, that is to say a connection which cannot be non-destructively released. That can also be implemented for example with a toggle lever clamping arrangement if the clamping levers engage in accurately fitting relationship or flush into a receiving means and are subsequently no longer accessible to the user.

Other kinds of non-releasable connections are also conceivable, for example a rivet connection or an adhesive connection, but in part involve a somewhat higher level of assembly effort and complication.

An inexpensive solution which allows high pressing force provides that the closure is in the form of a releasable screw connection. That for example even subsequently allows maintenance operations.

Flat electrical contacting of the channel shape against the contact bodies with the respectively associated conductor can be achieved predominantly and in particular or preferably exclusively by the clamping force produced by the closure on the peripheral surface of the respectively associated conductors, wherein that clamping force of the closure can be transmitted by the clamping shell portion to the contact body. Preferably all associated contact bodies are pressed with substantially the same biasing force against the respective peripheral surface of the conductor portion which is exposed in a step configuration, by virtue of predetermined dimensioning. Accordingly, electrical contacting can be effected in flat surface relationship and in force-locking fashion without further working steps.

Particularly when contact bodies are received in each of two clamping shell portions it is advantageous, for sufficient contacting, if the channel shape of the contact bodies extends over a proportion of the periphery of at least 20% to a maximum of 80% of the periphery, in particular a peripheral angle of at least 120° to a maximum of 270°, of the associated concentric conductor.

It is alternatively also possible to provide a channel shape in the manner of clamping sleeves, that is to say to provide that the channel shape of the contact bodies extends over a peripheral portion of more than 60% up to 95% or more of the periphery of the associated concentric conductor. In that respect two oppositely disposed receiving means of the clamping shell portions can respectively receive and apply pressure to such a contact body, for example by the free cross-section of the receiving means being of an undersize in relation to at least the clamping sleeve and possibly the associated conductor.

Therefore, there can be contact bodies disposed separately in each clamping shell, or there can be common contact bodies for each radial step, which are pressed by the cooperation of the clamping shells against the respective "round conductor", similarly to clamping sleeves. The latter configuration substantially simplifies assembly, for example if the contact bodies include contact pins or sockets, as described hereinafter.

In a structure which is simple to manufacture the contact bodies are at least in part of a channel shape of arcuately curved cross-section, in particular a cross-section curved in the shape of a circular arc.

It is also possible to provide an irregularly curved cross-section, for example involving an undulated or toothed configuration of the curvature around the associated conductor. That more complicated configuration can increase the total contact surface area available and for example can implement "hooking engagement" with the individual wires of the conductors, for example for a lengthwise arresting action.

Contact bodies which are desirable are those which are produced in one piece, for example in the form of shaped sheet metal parts, for example of copper sheet, in which respect the basic shape to be configured can be produced by stamping. Alternatively contact bodies produced by machining are also possible, for example with milled copper parts.

A development which is particularly effective and time-saving is one in which the contact bodies are of the channel shape in a first region and include contact pins or contact sockets for a plug-in connector in an oppositely disposed second region. If that kind of contact body is present in at least one contact shell portion assembly of the special cable with a plug-in connector is considerably facilitated as contacting itself can already inherently provide or produce the plug-in connector.

A development provides that the clamping shell portions of the contact apparatus itself, possibly with further housing portions, form component parts of a multi-part plug connector housing. Preferably the plug connector housing desired for this use can also substantially comprise the clamping shell portions so that there is no need for further working steps for plug connector assembly. The plug connector can be for example a heavy current plug or a heavy current sleeve, like for example in accordance with IEC 62196 Type 2 or the like.

Particularly in the case of a combination of the two above-described developments it is therefore advantageous if the clamping shell portions have the receiving means in a first region and housing portions of a plug or a coupling in an opposite second region, and in particular include in the second region at least one respective contact carrier at the end for a contact pin or a contact socket. In that way contacting of the concentric conductor can involve plug assembly at the same time in one working step.

For certain classes of protection, it is desirable if the clamping shell portions have at least one seal at their interface, for example to make the plug connector housing splash water-tight. In that way it is possible to achieve a high IP protection class, for example IP67. In addition, the clamping shell portions can also have a strain relief means at the cable end of the first region so that the strain relief means and possibly also a feeling means at the outer periphery can also be achieved at the same time with the closure.

A further simplification is achieved if the contact apparatus has precisely two clamping shell portions, in particular shaped portions of plastic, for example injection-molded portions, which are produced in the form of half-shells. They can also be produced in the form of identical portions. In that way the most widely varying special cables can be contacted and optionally assembled with a few types of clamping shell portions shell portions, in which respect a contact body does not necessarily have to be provided in each receiving step. Therefore, there can be at least a number of receiving means corresponding to the number of concentric conductors in each clamping shell portion, or at least some receiving means of each clamping shell portion can respectively have the channel shape of a contact body and the peripheral portion surrounded thereby of the associated conductor.

The cable core can be purely in the form of a mechanical support, but preferably itself includes a further conductor of individual wires for the purposes of spatial optimization. Optionally it is possible to provide for each insulation between a pair of adjoining concentric conductors, a support layer which prevents individual wires from being pressed into the insulation. That is appropriate in particular when high pressing forces are involved.

For diameter optimization, it is further advantageous if the cross-section of the individual wires decreases outwardly from a concentric conductor to the next concentric conductor. Thus, for example the wire cross-section can be reduced in accordance with the ratio of the radii from one conductor to the next as the distribution periphery for the individual wires increases. Thus, depending on the respective nominal current strength, the conductor cross-section can selectively be adapted by suitable choice of the individual wires in order further to reduce the overall diameter. Advantageously for example the protective conductor is arranged radially outwardly as in accordance with the standard same can be of a smaller cross-section than the current-carrying conductors.

The line and contacting structure according to the invention is found to be particularly advantageous when three or more concentric conductors are arranged around the cable core, and two or more conductors of very large cross-section, for example each of an overall annular cross-section of at least 20 mm$^2$, in particular over 60 mm$^2$ serve as the current supply conductor. For direct current up to 500A for example conductor cross-sections >90 mm$^2$ are required. The invention also affords considerably advantages in relation to multi-purpose lines if, besides the current supply lines, there is at least one signal conductor for data transmission of markedly smaller overall cross-section.

Manufacture of the special cable can be effected in per se known manner. It is mechanically advantageous if each conductor comprises braided individual wires, and they are preferably braided in an alternately opposite winding direction from one conductor to the next. As described in DE 40 04 802 A1 the conductors can be braided for example on to the respectively interposed insulation.

The invention also concerns the contact apparatus as such, in particular for a plug-in connector, having the features from one of the foregoing embodiments.

A possible application of the invention is in the field of charging stations for electric vehicles, where, because of the desire for higher charging currents and required handleability by the end user, particular advantages are achieved. The invention affords advantages also in other applications involving high current strengths.

The invention however can basically be applied to all kinds of electrical multi-conductor cables, including pure data lines, as a reduction in diameter with at the same time a reduction in the assembly complication and effort is desirable in many areas.

BRIEF DESCRIPTION OF THE DRAWINGS

Further advantageous features and effects of the invention are described more fully hereinafter by means of an embodiment by way of example with reference to the accompanying drawings in which.

DETAILED DESCRIPTION

Figure 1A:
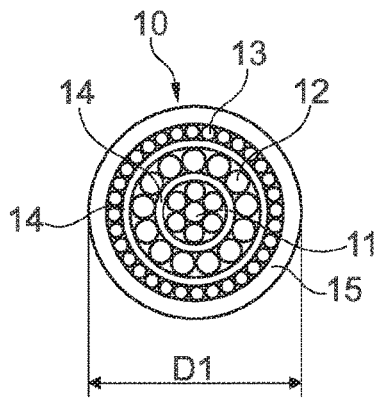
FIGS. 1A-1B show purely by way of example a cross-section through a conventional multi-conductor cable (FIG. 1B) and a multi-conductor cable according to the invention (FIG. 1A)
Figure 1B:
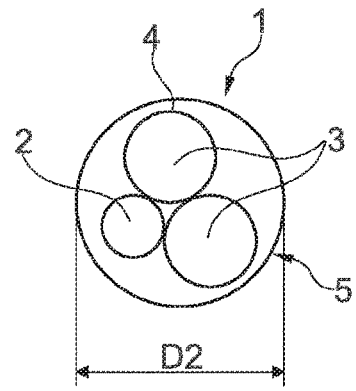

FIG. 1B shows as conventional multi-conductor cable 1 having three wires 2, 3, that is to say conductors consisting of individual wires with a respective insulation 4. They are guided in mutually parallel juxtaposed relationship in an outer casing 5. Depending on the respectively required conductor cross-section of the wires 2, 3 there is a given overall diameter D2.

In comparison the concentric cable structure according to the invention as shown in FIG. 1A affords a perceptible reduction in the overall diameter D1 with the conductor cross-section remaining the same. FIG. 1A shows a multi-conductor cable 10 having a first inner conductor 11 comprising individual wires as the core, a second conductor 12 which is disposed concentrically on the insulation 14 of the inner conductor 11 and which is of substantially identical conductor cross-section to the conductor 11. In addition, a third concentric conductor 13 is also arranged in ring form around the central axis (perpendicularly to FIG. 1B) as a protective conductor on the insulation 14 of the second conductor 12, wherein the conductor cross-section of the third conductor 13 can be less. In comparison with the overall diameter D2 of the conventional cable structure shown in FIG. 1B the cable is of a diameter D1 which is reduced by about 20% to 25%, measured at the outer casing 15. That increases amongst other things the flexibility and thus handleability of the cable 10. Naturally cables with more than three conductors can also be similarly constructed (not shown).

Figure 2A:
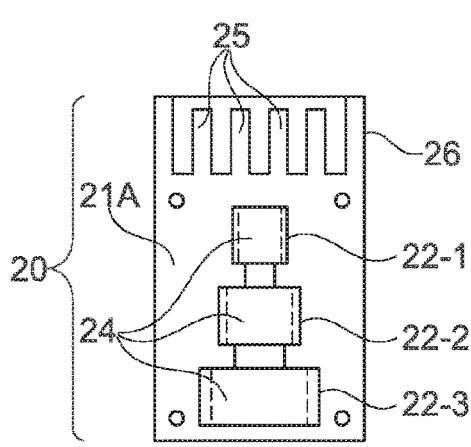
FIGS. 2A-2C show diagrammatic views of an embodiment of a contact apparatus for a multi-conductor cable as shown in FIG. 1A.
Figure 2B:
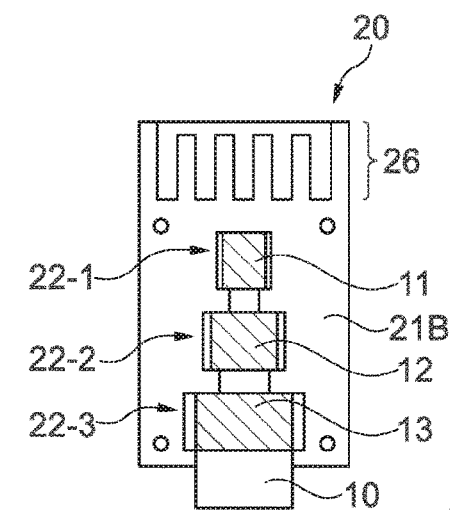
Figure 2C:
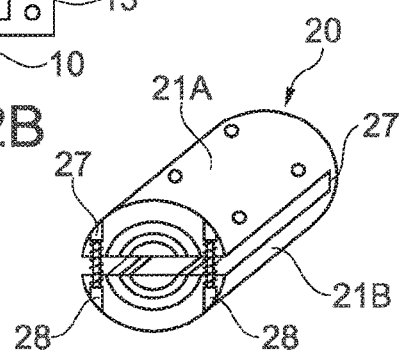

FIGS. 2A-2C show purely by way of example a contact apparatus 20 according to the invention for simplified assembly of a special cable 10 as shown in FIG. 1A.

The contact apparatus 20 here has two clamping shell portions 21A, 21B in the form of half-shells of substantially identical structure, for example in the form of plastic identical portions produced by injection molding. At the inside the clamping shell portions 21A, 21B have a plurality of receiving means 22-1, 22-2, 22-3 which are radially stepped relative to each other, here being of a cylindrical trough-like configuration. The radius of the receiving means 22-1, 22-2, 22-3 decreases from the cable end inwardly in a stepped configuration, corresponding to a stepped casing arrangement around the individual conductors 11, 12, 13 of the special cable 10. In FIGS. 2A-2C received in each receiving means 22-1, 22-2, 22-3 is a corresponding contact body 23-1, 23-2, 23-3, associated with a respective one of the concentric conductors 11, 12, 13 for the purposes of contacting with the plug-in connector (see below).

Figure 3A:
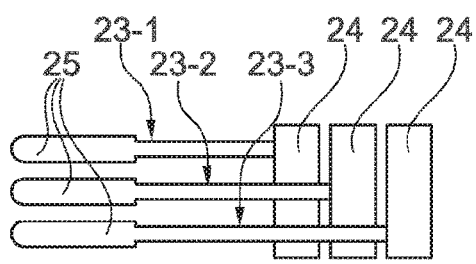
FIGS. 3A-3B show diagrammatic views of a plurality of contact bodies for a contact apparatus according to the invention as a side view (FIG. 3A) and a front view (FIG. 3B)
Figure 3B:
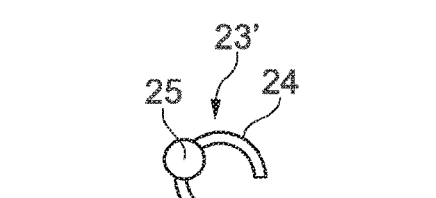
Figure 4:
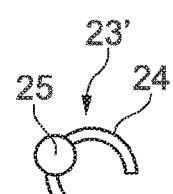
FIG. 4 shows a diagrammatic front view of a further contact body.

Contact bodies 23-1, 23-2, 23-3 by way of example are shown in FIGS. 3-4. In a first region each contact body 23-1, 23-2, 23-3 is substantially of a channel shape 24 with a longitudinal extent (in the plane in FIG. 3A) and of curved cross-sectional configuration (FIG. 3B/4) along a peripheral portion, to be contacted, of the associated conductor 11, 12, 13. In FIG. 3B the channel shape 24 extends over a peripheral angle of about 180° so that one or two contact bodies 23-1, 23-2, 23-3 can be selectively provided in both clamping shell portions 21A, 21B. Produced in an opposite second region are contact pins 25 (or also contact sockets) integrally connected to the contact body 23-1, 23-2, 23-3 and by way of a bar to the channel shape 24. The contact pins 25 are provided for a plug-in connector 26 (FIGS. 2A-2B). In the structure shown in FIG. 3B, depending on the respective conductor 11, 12, 13 and the position of the contact pin 25, the appropriate contact body 23-1, 23-2, 23-3 is selected or produced in the finished plug-in connector 26. The variant illustrated in FIG. 4 shows a contact body 23', the channel shape 24 of which extends in the first region over a peripheral angle of about 320-340° so that it is possible to provide in each receiving means 22-1, 22-2, 22-3 only one respective contact body 23'. Here the position of the contact pin 25 can be adjusted by rotation about the main axis of the cable 10 or the plug-in connector 26 in the receiving means 22-1, 22-2, 22-3, so that a separate contact body is possibly not necessary for each conductor 11, 12, 13. The channel shape 24 can involve a cross-section curved in the form of a circular arc (FIG. 3B/4), or can also be of an irregularly curved configuration, for example with a tooth configuration, if contacting over a large area in force-locking relationship with the outer peripheral surface of the respective conductor 11, 12, 13 is ensured.

As can best be seen from FIG. 2A-2C the two clamping shell portions 21A, 21B at the same time form a plug connector housing with contact carriers of suitable configuration for the contact pins 25. They are disposed in the region of a plug 26 which is opposite the receiving means 22-1, 22-2, 22-3 or the through opening for the special cable 10. As an alternative to the configuration in the form of the plug 26 a jack or socket is also possible in a completely similar fashion, in which case the clamping shell portions 21A, 21B can provide any desired plug connectors. The clamping shell portions 21A, 21B can thus be housing portions of a plug-in connector 26.

As a possible closure for fixedly connecting the clamping shell portions 21A, 21B, for example to provide a closed housing, and at the same time also to produce an electrically sufficiently contacting pressing force in respect of the contact bodies 23-1, 23-2, 23-3 or 23' respectively on the respectively exposed outside surface of the associated conductor 11, 12, 13, FIG. 2C shows purely by way of example a screw closure with four clamping screws 27 arranged at corners, and nuts 28. Alternatively, for example similarly to a clamping shell, it is possible to provide a hinge at a longitudinal side of the clamping shell portions 21A, 21B, while disposed at the opposite side is a clamping lever arrangement for more quickly and securely closing the clamping shell portions 21A, 21B. Further features are not shown in greater detail, like for example an integrated strain relief arrangement at the end for the end of the special cable 10, seals for particular IP protective classes, the passage means and arresting means for the contact pins 25 and so forth.

When the clamping shell portions 21A, 21B are connected in a closed position (not completely closed in FIG. 2C), each contact body 23-1, 23-2, 23-3 or 23' respectively is pressed for the purposes of contacting against the respectively associated concentric conductor 11, 12, 13, by the closure 27, 28. By virtue of the integral structure, the plug connector 26 is also made at the same time with the contact pins 25 so that a considerable reduction in terms of assembly involvement is achieved and the special cable 10 is reliably contacted.

LIST OF REFERENCES

FIGS. 1A-1B
1 conventional multi-conductor cable
2, 3 wires
4 insulation
5 outer casing
10 concentric special cable
11, 12, 13 annular conductors
14 insulation
15 outer casing
D1, D2 overall diameter
FIGS. 2A-2C and FIGS. 3-4
20 contact apparatus
21A, 21B clamping shell portions
22-1, 22-2, 22-3 receiving means
23-1, 23-2, 23-3 contact body
24 channel shape
25 contact pin
26 plug-in connector
27, 28 closure (clamping screws)

What is claimed is:
1. An electrical multi-conductor cable with contact apparatus for a plug-in connector, in particular a line with a charging plug at a charging station for electric vehicles, comprising:
a central cable core, a number of conductors which are arranged concentrically relative to each other in an annular shape around the cable core and comprising individual wires, and a respective insulation between the conductors, wherein
the contact apparatus includes two contact shell portions which at their inside have a plurality of receiving means which are stepped radially from each other,
arranged in the receiving means of at least one clamping shell portion is a respective contact body associated with one of the concentric conductors for contacting purposes, wherein each contact body has a channel shape with a longitudinal extent and of a curved cross-sectional configuration around a peripheral portion of the associated conductor,
there is provided a closure for connecting the clamping shell portions, which fixes the clamping shell portions to each other in a closed position,
the clamping shell portions in the closed position hold the contact bodies in coaxial relationship with each other and press each contact body for contacting purposes against the respectively associated concentric conductor, wherein surface electrical contacting of the channel shape of the contact bodies with the respectively associated conductor is achieved by clamping force produced by the closure and transmitted by the clamping shell portion on to the contact body, on to the peripheral surface of the respectively associated conductor, and wherein
the channel shape of the contact bodies extends over a peripheral portion of at least 20% to a maximum of 80% of the periphery, in particular a peripheral angle of at least 120° to a maximum of 270°, of the associated concentric conductor,
or
the channel shape of the contact bodies extends over a peripheral portion of about 60% to 95% of the periphery of the associated concentric conductor and two oppositely disposed receiving means of the clamping shell portions respectively receive and press such a contact body.

2. The cable according to claim 1, wherein the closure is in the form of:
a quick-action closure which can be closed without a tool in the form of a non-releasable quick-action closure,
a non-releasable rivet connection, or
a releasable screw connection.

3. The cable according to claim 1, wherein the channel shape of the contact bodies is of an arcuately curved cross-section, in particular a cross-section curved in the shape of a circular arc, or an irregularly curved cross-section.

4. The cable according to claim 3, wherein the contact bodies are respectively produced in one piece.

5. The cable according to claim 1, wherein in a first region the contact bodies have the channel shape and in an opposite second region they include contact pins or contact sockets for a plug-in connector.

6. The cable according to claim 5, wherein the clamping shell portions of the contact apparatus form component parts of a multi-part plug connector housing, the plug connector housing comprising the clamping shell portions.

7. The cable according to claim 6, wherein the contact apparatus has precisely two clamping shell portions which are produced in the form of half-shells.

8. The cable according to claim 5, wherein in a first region the clamping shell portions have the receiving means and in an opposite second region form housing portions of a plug or a coupling and in the second region include at least one end contact carrier for a contact pin or a contact socket.

9. The cable according to claim 8, wherein the clamping shell portions have at least one seal at their interface and/or a strain relief means at the cable end of the first region.

10. The cable according to claim 1, wherein there is provided at least a number of receiving means corresponding to the number of concentric conductors in each clamping shell portion and at least some receiving means of each clamping shell portion respectively receive the channel shape of a contact body and the peripheral portion, surrounded thereby, of the associated conductor.

11. The cable according to claim 1, wherein the cable core includes a further conductor comprising individual wires.

12. The cable according to claim 1, wherein for each insulation between a pair of adjoining concentric conductors there is provided a support layer which prevents individual wires from being pressed into the insulation.

13. The cable according to claim 1, wherein the cross-section of the individual wires decreases outwardly from one concentric conductor to the next concentric conductor.

14. The cable according to claim 1, wherein each conductor comprises braided individual wires with an alternately opposite winding direction from one conductor to the next and braided on to the interposed insulation.

15. The cable according to claim 1, wherein at least three concentric conductors are arranged around the cable core, wherein two conductors of a respective overall annular cross-section of at least 20 mm$^2$ serve as a power supply conductor.

16. The cable according to claim 15, wherein there is provided at least one signal conductor for data transmission of markedly smaller overall cross-section.

17. The cable according to claim 1 disposed at a charging station for electric vehicles.

18. The cable according to claim 1 as a charging cable for electric vehicles.

19. An electrical multi-conductor cable with contact apparatus for a plug-in connector, in particular a line with a charging plug at a charging station for electric vehicles, comprising:
a central cable core, a number of conductors which are arranged concentrically relative to each other in an annular shape around the cable core and comprising individual wires, and a respective insulation between the conductors, wherein
the contact apparatus includes two contact shell portions which at their inside have a plurality of receiving means which are stepped radially from each other,
arranged in the receiving means of at least one clamping shell portion is a respective contact body associated with one of the concentric conductors for contacting purposes, wherein each contact body has a channel shape with a longitudinal extent and of a curved cross-sectional configuration around a peripheral portion of the associated conductor,
there is provided a closure for connecting the clamping shell portions, which fixes the clamping shell portions to each other in a closed position,
the clamping shell portions in the closed position hold the contact bodies in coaxial relationship with each other and press each contact body for contacting purposes against the respectively associated concentric conductor,
wherein in a first region the contact bodies have the channel shape and in an opposite second region they include contact pins or contact sockets for a plug-in connector, and
wherein in a first region the clamping shell portions have the receiving means and in an opposite second region form housing portions of a plug or a coupling and in the second region include at least one end contact carrier for a contact pin or a contact socket.

20. An electrical multi-conductor cable with contact apparatus for a plug-in connector, in particular a line with a charging plug at a charging station for electric vehicles, comprising:
a central cable core, a number of conductors which are arranged concentrically relative to each other in an annular shape around the cable core and comprising individual wires, and a respective insulation between the conductors, wherein the contact apparatus includes two contact shell portions which at their inside have a plurality of receiving means which are stepped radially from each other, arranged in the receiving means of at least one clamping shell portion is a respective contact body associated with one of the concentric conductors for contacting purposes, wherein each contact body has a channel shape with a longitudinal extent and of a curved cross-sectional configuration around a peripheral portion of the associated conductor, there is provided a closure for connecting the clamping shell portions, which fixes the clamping shell portions to each other in a closed position, the clamping shell portions in the closed position hold the contact bodies in coaxial relationship with each other and press each contact body for contacting purposes against the respectively associated concentric conductor, and wherein at least three concentric conductors are arranged around the cable core, wherein two conductors of a respective overall annular cross-section of at least 20 $mm^2$ serve as a power supply conductor.

* * * * *